UNITED STATES PATENT OFFICE.

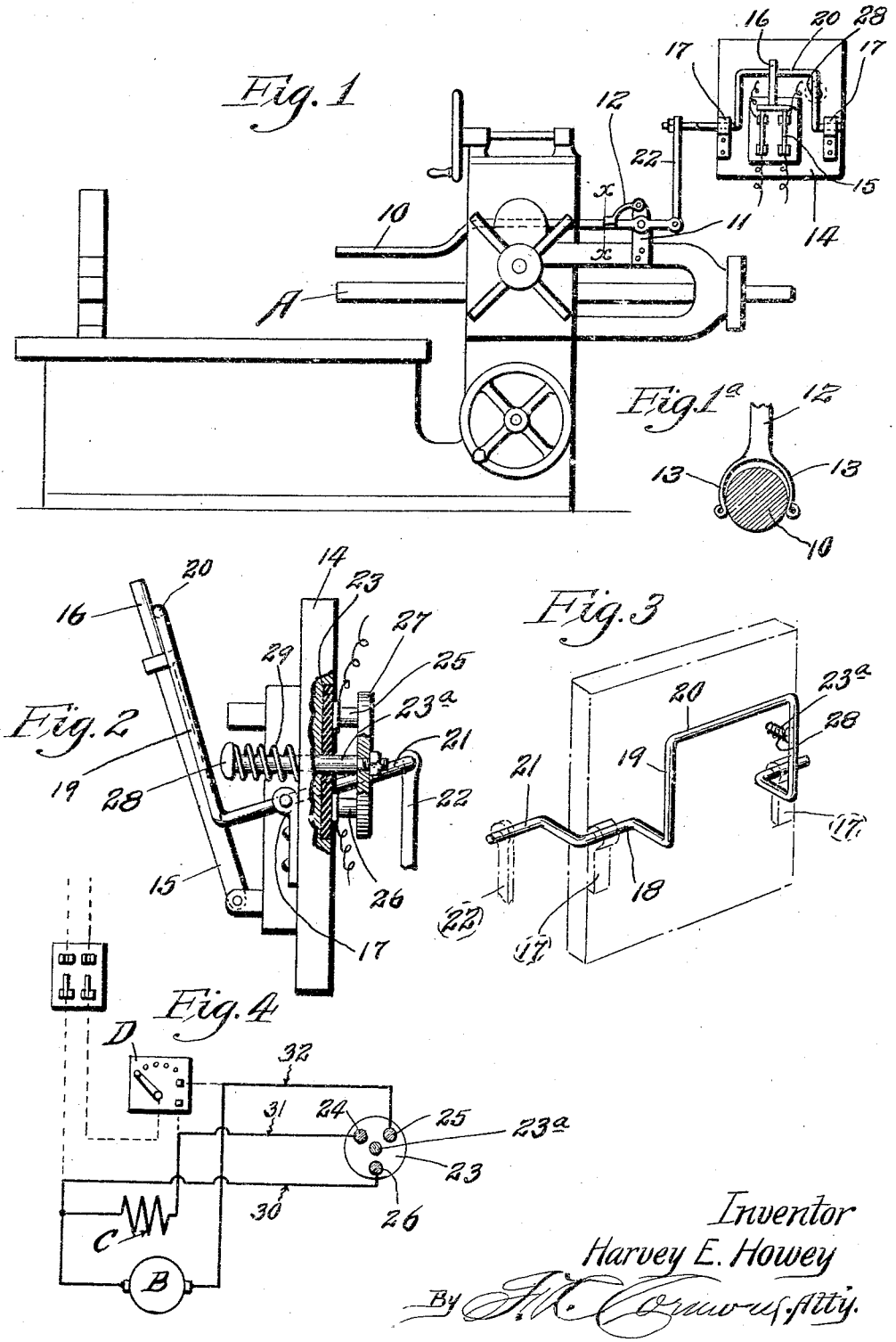

HARVEY E. HOWEY, OF GRANITE CITY, ILLINOIS.

SAFETY APPLIANCE FOR ELECTRICALLY-DRIVEN MACHINES.

1,294,664.  Specification of Letters Patent.  Patented Feb. 18, 1919.

Application filed November 19, 1917. Serial No. 202,815.

*To all whom it may concern:*

Be it known that I, HARVEY E. HOWEY, a citizen of the United States, residing at Granite City, Illinois, have invented a certain new and useful Improvement in Safety Appliances for Electrically-Driven Machines, of which the following is a full, clear, and exact description, such as will enable others skilled in the art to which it appertains to make and use the same, reference being had to the accompanying drawings, forming part of this specification.

My invention relates to a safety appliance in the nature of a switch throw-out and a dynamic brake for electrically driven machines such as drills, lathes and the like, the principal object of my invention being to provide a comparatively simple and efficient appliance which can be actuated or released with comparatively little effort and which will be effective in instantly throwing out the line switch of the motor utilized in driving the machine and at the same time making connections which will in effect cause the motor to perform the functions of a dynamic brake to quickly bring the operating parts of said motor and the machine to rest.

In connection with my improved safety appliance, it will be understood that in machine shops, factories and the like, the comparatively large machines such as lathes, drills and the like are driven by electric motors, and further, that the workmen or attendants of such machines are to a certain extent in danger of coming in contact with the tools carried by said machines, and it is one of the purposes of my invention to provide simple means for instantly bringing the operating parts of machines to a standstill, thereby minimizing the danger of accidents to workmen or machine attendants.

With the foregoing and other objects in view, my invention consists in certain novel features of construction and arrangement of parts, hereinafter more fully described and claimed, and illustrated in the accompanying drawings, in which—

Figure 1 is an elevational view of a horizontal drill and showing a safety appliance of my improved construction applied thereto;

Fig. 1ª is an enlarged section taken approximately on the line $x$—$x$ of Fig. 1;

Fig. 2 is a side elevational view partly in section of a supporting block for the line switch and parts of the dynamic brake and showing the means for opening said switch and closing the contacts for the dynamic brake;

Fig. 3 is a perspective view of a rock shaft forming a part of my improved safety appliance;

Fig. 4 is a diagrammatic view illustrating the connections between the motor, the starting rheostat, the line switch, and the contacts utilized for producing the dynamic brake.

Referring by numerals to the accompanying drawings, which illustrate a practical embodiment of my invention, 10 designates a bar or rail, preferably of metal, the same being pivotally mounted near one end to a bracket 11 which latter is fixed to a portion of the machine frame. In the present instance, I have shown this bar applied to a horizontal drill or boring machine, and as shown, the free end of said bar is horizontally disposed immediately above the tool carrying member A of the machine.

Secured to the bracket 11 is one end of an arm 12, the lower outer end of which is bifurcated to form spring fingers 13 which receive the bar as illustrated in Fig. 1ª and retain it in a substantially horizontal position. A very slight pressure on that portion of the bar positioned adjacent to the member A will disengage said bar from the fingers 13 and permit it to swing vertically upon its pivot on the bracket 11.

Arranged on a suitable base 14 which is disposed adjacent to the machine to which my improved device is applied is an ordinary line switch 15, the same controlling the electrical connections from the source of supply to the motor utilized for driving the machine, said switch being provided with the usual operating handle 16.

Positioned on base 14 are bearings 17 in which are mounted parts of a rock shaft 18. That portion of the rock shaft between the bearings 17 is bent forwardly, thence upwardly to form cranks 19, the upper ends thereof being connected by a part 20 which normally lies immediately to the rear of the switch handle 16. One end of this rock shaft is bent to form a crank arm 21 and pivotally connected to the end thereof is one end of a link 22, the opposite end being connected to the end of bar 10.

Seated on the rear side of base 14 is a block 23 of suitable insulating material, and fixed thereto and projecting outwardly therefrom are three contact posts 24, 25 and 26, the same being preferably formed of carbon or like material.

Arranged to slide freely through base 14 and block 23 of insulation and disposed between the three contact posts, is a rod 23ª, the rear end of which carries a contact plate 27, preferably of metal, said plate being adapted to make contact with the three contact posts 24, 25 and 26. Formed on the front end of this rod 23ª is a head 28 and located on said rod and disposed between the head and base 14 is a compression spring 29. The head 28 normally bears directly against one of the crank arms 19 as illustrated in Fig. 3.

In Fig. 4 I have shown the electrical connections from the line to the motor and starting rheostat and from said parts to the dynamic contacts, these connections including a wire 30 from one side of the main line between the line switch and the armature B of the motor to contact post 26, a wire 31 from the connection between the field C of the motor and the rheostat D to contact post 24, and a line 32 from the connection between the armature of the motor and the starting rheostat to contact post 25.

Under normal conditions, or with the parts properly assembled for use, bar 10 occupies a substantially horizontal position as illustrated in Fig. 1 with a portion arranged immediately adjacent the tool carrying member A, said bar being held in its position by the spring fingers 13. When so positioned, the line switch is closed with the handle 16 bearing directly against the member 20 of rock shaft 18. When the rock shaft is thus positioned, rod 23ª occupies a position in base 14 so that contact plate 27 is out of engagement with the contact members 24, 25 and 26, and when the rod is thus positioned, spring 29 is compressed or under tension.

When it is desired to actuate my improved safety appliance for the purpose of instantly stopping the motor and bringing the operating parts of the machine to a standstill, bar 10 is struck lightly or with sufficient force to disengage it from the spring fingers 13 and as a result of such action, said bar will swing upon its pivot and link 22 will be actuated so as to rock shaft 18 in its bearings. As said shaft is thus rocked, member 20 of said shaft will bear against the rear side of switch handle 16 and force said handle outwardly with the result that the switch is opened. This opening movement of the switch is accelerated by the action of spring 29 which exerts its power to bring about a quick movement of the rock shaft, and as rod 23ª is carried forward, plate 27 is brought into contact with the members 24, 25 and 26. This action establishes connections between the contact posts 24, 25 and 26 and the line connections of the starting rheostat and the field and armature of the motor with the result that any residual magnetism remaining in the motor field and armature and the tendency of the armature to continue to rotate will be utilized to cause said parts to perform the functions of a dynamic brake, thereby bringing the motor and the operating parts of the machine to a standstill. Thus, if a workman or machine attendant is in danger of injury as a result of coming in contact with the tools carried by the machine, said machine, its operating parts and its driving motor can be almost instantly stopped, for, as hereindescribed, the appliance is thrown into instant operation by a slight movement of bar 10.

A safety appliance of my improved construction is comparatively simple, can be readily combined with practically all large machines which are driven by an electric motor, and provides efficient means for minimizing accidents to workmen and machine attendants whose work necessarily brings them in close approximity to the machine tools and operating parts therefor.

It will be readily understood that minor changes in the size, form and construction of the various parts of my improved safety appliance can be made and substituted for those herein shown and described, without departing from the spirit of my invention, the scope of which is set forth in the appended claims.

I claim:

1. The combination with a machine, the driving motor therefor and the line switch for the motor, of a safety bar pivotally mounted on the machine adjacent to an operating part thereof, a member adapted to engage and hold said safety bar in set position, a rock shaft arranged adjacent to the switch and adapted to actuate the handle thereof, and connections from the safety bar to said rock shaft.

2. The combination with a machine, a driving motor therefor, and a switch in the line to said motor, of means associated with said switch for shifting the same into open position, a member positioned on the machine adjacent to one of the operating parts thereof, a spring catch adapted to engage said last mentioned member and hold it in set position, and connections between said member and the switch actuating means.

3. The combination with a machine and the driving motor therefor, of connections to the line to said motor and to the field and armature thereof, means for closing the circuits through said connections, a member pivotally mounted on the machine adjacent to an operating part thereof, a spring catch adapted to engage said pivotally mounted member and retain it in set position, and means adapted to be actuated by said last mentioned member for operating said circuit closing means.

4. The combination with a machine, the driving motor therefor, and a switch in the line to said motor, of means for actuating said switch to open the same, a portion of which means is arranged on the machine adjacent to an operating part thereof, and automatically operating means for causing the motor to act as a dynamic brake when the switch is opened, which last mentioned means includes a rock shaft adapted to engage the switch handle and move the same to open position, a safety bar pivotally mounted on the machine, a connection from said safety bar to the rock shaft, and a spring catch adapted to engage and retain said safety bar in set position.

In testimony whereof I hereunto affix my signature this 17th day of November, 1917.

HARVEY E. HOWEY.

Copies of this patent may be obtained for five cents each, by addressing the "Commissioner of Patents, Washington, D. C."